March 6, 1973 W. D. JONES 3,719,471
ANTI-POLLUTION BURNER SYSTEM
Filed Jan. 23, 1970 4 Sheets-Sheet 1

INVENTOR
WILLIAM D. JONES by

ATTORNEYS

March 6, 1973 W. D. JONES 3,719,471
ANTI-POLLUTION BURNER SYSTEM
Filed Jan. 23, 1970 4 Sheets-Sheet 3

INVENTOR
WILLIAM D. JONES
ATTORNEYS

United States Patent Office 3,719,471
Patented Mar. 6, 1973

3,719,471
ANTI-POLLUTION BURNER SYSTEM
William D. Jones, Point Pleasant, N.J., assignor to American Metal Climax, Inc., New York, N.Y.
Filed Jan. 23, 1970, Ser. No. 5,250
Int. Cl. C22b 9/00, 15/14; C21b 3/04
U.S. Cl. 75—65                                                1 Claim

ABSTRACT OF THE DISCLOSURE

A system is provided for recovering copper from insulated copper scrap containing electrical insulation of the type comprising plastic, rubber and the like which, upon being thermally decomposed and partially combusted, forms a waste gas which may pollute the atmosphere. The scrap is thermally treated in a cupola to form blister copper and the thermally decomposed insulation is separated as a waste gas and passed through an after burner where it is substantially completely combusted and the effluent gas therefrom then scrubbed and passed through an electrostatic precipitator following which it is vented to the atmosphere as relatively clean gas.

This invention relates to a system and method for recovering copper from insulated copper wire scrap while substantially inhibiting pollution of the atmosphere with noxious waste gas produced from the destructively distilled insulation.

PROBLEM CONFRONTING THE ART

Air pollution from industrial waste gases presents a serious threat of increasing significance to the health and welfare of people living in industrial areas. This is particularly true in the secondary recovery of metals, such as copper from insulated copper wire scrap. In recent years, plastics, in addition to rubber and other insulation material, have come into increasing use as electrical insulation. Examples of such insulation are polyethylene, polyvinyl chloride, polytetrafluoroethylene sold under the trademark "Teflon," polypropylene, neoprene, rubber, and the like. These materials are subject, when heated to an elevated temperature, to destructive distillation which forms partially combusted organic volatilization products which can be extremely noxious when ventilated to the atmosphere as stack gases. In a recent symposium on solid-waste disposal reported in the "New York Times" on Oct. 22, 1969, polyvinyl chloride, otherwise referred to as "PVC," was singled out in particular as creating an environmental hazard in that it throws off hydrochloric acid when it is incinerated. The acid becomes an irritant in the air and tends to produce adverse effects on a person's skin and upper respiratory system. Fluorine-containing plastic can be even more noxious.

STATE OF THE ART

A method proposed for recovering copper from insulated copper wire scrap comprises heating a charge of the scrap in a cupola under conditions to effect the melting of the copper while destructively distilling off the organic plastic or rubber material making up the insulation. The organic vapors which are combustible and extremely noxious are fed into a combustion chamber comprising a plurality of checkerwork brick partitions maintained at an elevated temperature by virtue of the exothermic heat given off as the waste gases are burned, the resulting effluent gas being then vented into the atmosphere via a stack. A disadvantage of the foregoing method is that the organic gases are quite corrosive and attack the brickwork in the combustion chamber and generally the life of the chamber is short and require replacement. In addition, the effluent gases vented to the atmosphere are not completely combusted and contain acid-forming radicals and, therefore, are not sufficiently clean and present the problem of air pollution.

The present invention overcomes the foregoing disadvantages by providing a system which utilizes a specially designed after-burner assembly for effecting substantially complete combustion of the corrosive organic gases, while inhibiting corrosion of the assembly by the waste gases. In addition, the system includes as a preferred embodiment a scrubber and an electrostatic precipitator for further assuring relatively clean and acid-free effluent gas vented to the atmosphere.

It is thus the object of the invention to provide a system for recovering copper from organically insulated copper wire scrap while inhibiting pollution of the atmosphere from gaseous by-products thereof.

Another object is to provide a method for the recovery of copper in the form of blister copper from insulated copper wire scrap in which method organic vapors from destructively distilled plastic or rubber insulation are treated to inhibit air pollution by such vapors.

These and other objects will more clearly appear when considereded in the light of the following disclosure and the accompanying drawings, wherein.

STATEMENT OF THE INVENTION

Stating it broadly, the invention provides a system for treating partially combusted waste gases obtained from the destructive distillation of insulated copper wire scrap in a cupola while recovering the metal as blister copper. The waste gas is fed to an after-burner assembly comprising a water-cooled housing having a burner section at one end thereof, the opposite end being closed and a waste gas inlet opening in a side wall of the assembly intermediate the ends which communicates with the burner section. The burner assembly has a concentrically arranged pipe assembly disposed longitudinally through the housing and extending to the burner section, the pipe assembly comprising a fuel atomizing assembly (steam atomized) within an air pipe which, in turn, is surrounded by a water jacket. A combustion flame is established in the burner section by feeding fuel and air through said concentric pipe assembly, the fuel, e.g. oil, being atomized by passing through a steam atomizer at the end of the fuel pipe terminating in the burner section. The partially combusted waste gas is fed into the inlet opening of the assembly and out into the burner section longitudinally of the burner assembly around the flame, whereby the waste gas is substantially completely combusted to form effluent gas which is preferably further treated by passing it through a scrubber, then through an electrostatic precipitator and finally vented out through the atmosphere as relatively clean effluent gas.

Figure 1:
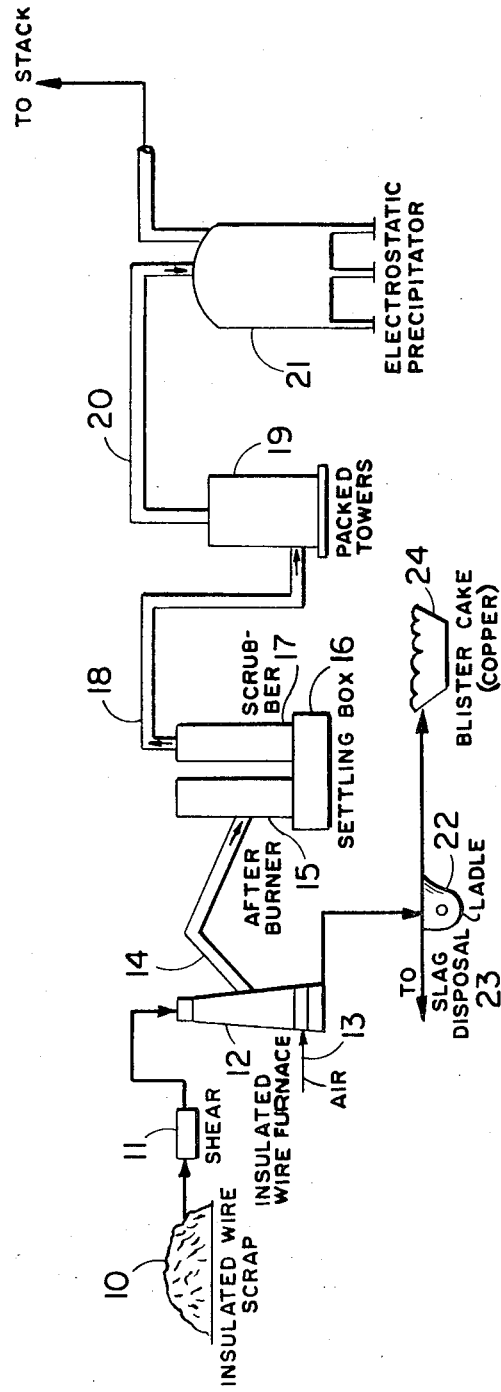
FIG. 1 shows diagrammatically one embodiment of a system illustrating the invention.

As illustrative of one embodiment of an antipollution system for carrying out the invention, reference is made to FIG. 1 which depicts a pile of insulated scrap wire 10 which is sheared (11) and the sheared scrap fed to a vertically standing cupola 12 as shown. In starting the cupola, a bed of carbon is prepared at the bottom thereof and the carbon ignited and the combustion thereof maintained by injecting air 13 via tuyeres disposed around the cupola. The alternate layers of scrap and carbon are fed into the cupola to the top thereof.

As the temperature increases due to the combustion of the carbon, the insulation, which may comprise polyethylene, polyvinyl chloride, polytetrafluoroethylene, polypropylene, rubber, or the like, is destructively distilled or decomposed and the copper near the bottom where the temperature is the highest is melted and allowed to collect as a molten bath. The partially combusted organic vapors are drawn off intermediate the top and bottom of the cupola at a temperature of about 400 to 1200° F. via conduit or pipe 14 and conducted to the after-burner 15 (note also FIG. 2) where the organic vapors are substantially completely combusted at a temperature ranging from 2000° F. to 2300° F. or 2400° F., the resulting effluent gas being then passed through settling box 16 and up through scrubber 17 where the effluent gas is washed with an alkaline solution, e.g. an ammoniacal solution, to remove any acid in the gas, for example, HCl formed from the destructive distillation of polyvinyl chloride. The alkaline wash solution may be lime water, dilute sodium hydroxide or carbonate, or the like.

The effluent gas is removed from the scrubber through the top thereof via pipe 18, passed through at least one packed tower 19 to complete the gas scrubbing and neutralize the saturated effluent gas and then fed via pipe 20 to electrostatic precipitator 21 where colloidal solids are removed and the relatively clean gas then vented to the atmosphere through the stack. The molten copper and slag are tapped at intervals from the bottom of the cupola into ladles 22, the slag being poured off as shown at 23, the blister copper being cast into cakes such as shown at 24.

The details of the after-burner assembly will be apparent from FIGS. 2 to 5. The construction of the after-burner is unique in that it is completely water-cooled and resists high temperature corrosion by the decomposition products resulting from the destructive distillation of the organic insulating materials. The after-burner assembly can be constructed of any type of weldable steel to suit conditions and comprises a housing designated generally by the numeral 25 substantially completely surrounded by a water jacket shell 26, the assembly being closed at one end 27 and being comprised of a burner section 28 at its opposite end which communicates with combustion chamber 29.

A concentrically arranged pipe assembly designated generally by the numeral 30 passes longitudinally through the closed end thereof to and into the burner section, the pipe assembly being made up of a fuel atomizing assembly 31 surrounded by an air pipe 32, a major portion of which in turn is surrounded by a water jacket 33. The fuel pipe and air pipe are maintained in concentric relationship via mutual flanges 34, 34A and 35, 35A, the flanges being fastened together by bolts.

The fuel atomizing assembly extends into burner section 28, the air pipe 32 surrounding the fuel atomizing assembly also extending to the burner section to provide air at the atomizing end of the assembly. The air pipe is provided with a flanged opening 37 at the top thereof through which air is fed under pressure and caused to flow downward through the annulus surrounding the fuel atomizing nozzle 36 as well as out through openings 38, 38A where the air mixes with waste gas to be described later. The water jacket 33 surrounding the air pipe 32 has pipe inlets 39, 39A through which water is circulated, the water jacket of the pipes being closed off at annulus 33A. The circulating water in the outer pipe is caused to circulate through water jacket shell 26 via four hollow spider connections 40 which serve the two-fold function of centrally locating the concentrically arranged fuel and air pipes at the after-burner section as well as structural struts for the after-burner assembly. Thus, water flows through pipe connections 39, 39A down water pipe jacket 33, through hollow spiders 40 into water jacket shell 26 and out through exit pipes 41 shown in FIG. 3. A sight tube 42 is provided extending at an angle downwardly into the housing of the assembly for inspecting the operation of the after-burner.

The assembly has a side inlet opening 43 through which the waste gas is directed, for example, at a temperature of about 1200° F., the gas being fed via a conduit which would be coupled to flange 43A (not the schematic of FIG. 1). As will be noted, as the hot waste gas enters the housing, the materials of the housing are protected by water jacket 26 and the fuel and air pipes 31 and 32, respectively, by water jacket 33. Thus, the complete housing, as well as the concentrically arranged pipes, are protected from the hot corrosive waste gas entering the housing of the after-burner assembly. The waste gas enters transverse to the longitudinal axis of the housing and then moves longitudinally thereof towards the burner section where the waste gas mixes with air coming out of ports or openings 38, 38A, the mixture then passing downward around the burner flame where it is substantially completely consumed and thereafter passed out of combustion chamber 29 for subsequent treatment (neutralization of acids, removal of solid particles, etc.).

Figure 2:
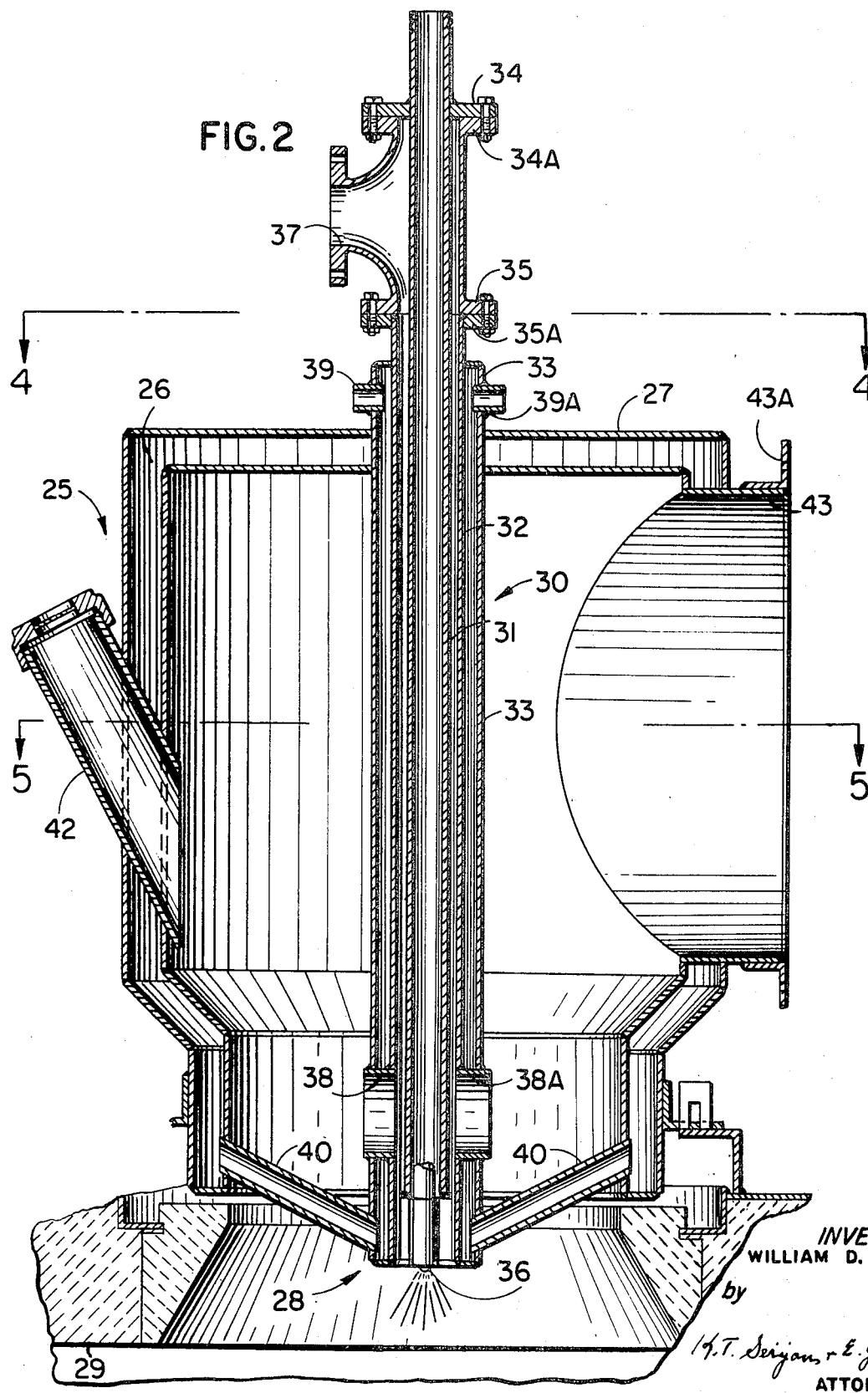
FIG. 2 is illustrative of an after-burner taken in longitudinal section along line 2—2 of FIG. 4.
Figure 3:
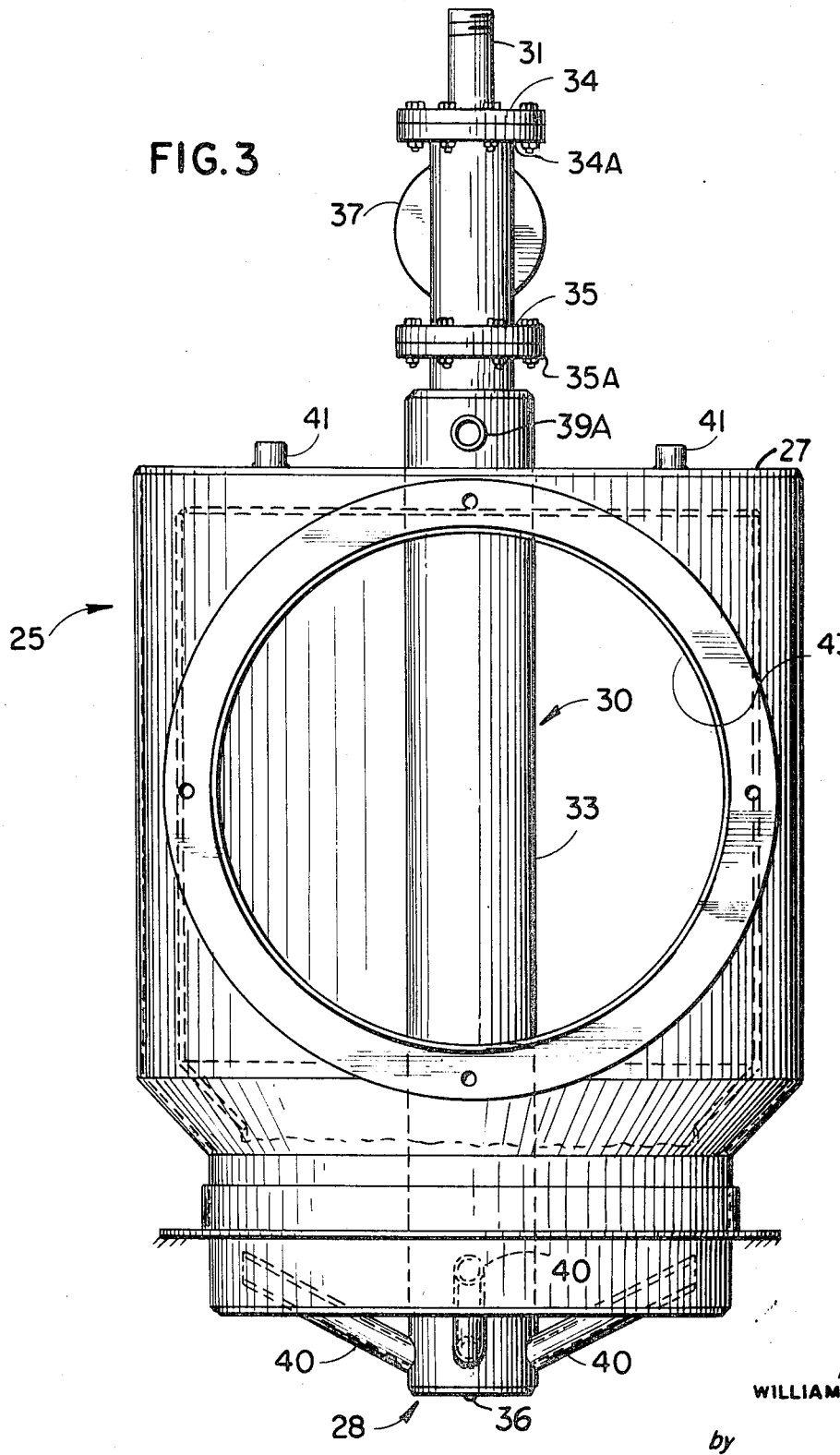
FIG. 3 shows in elevation a side view of the after-burner shown in FIG. 2.
Figure 4:
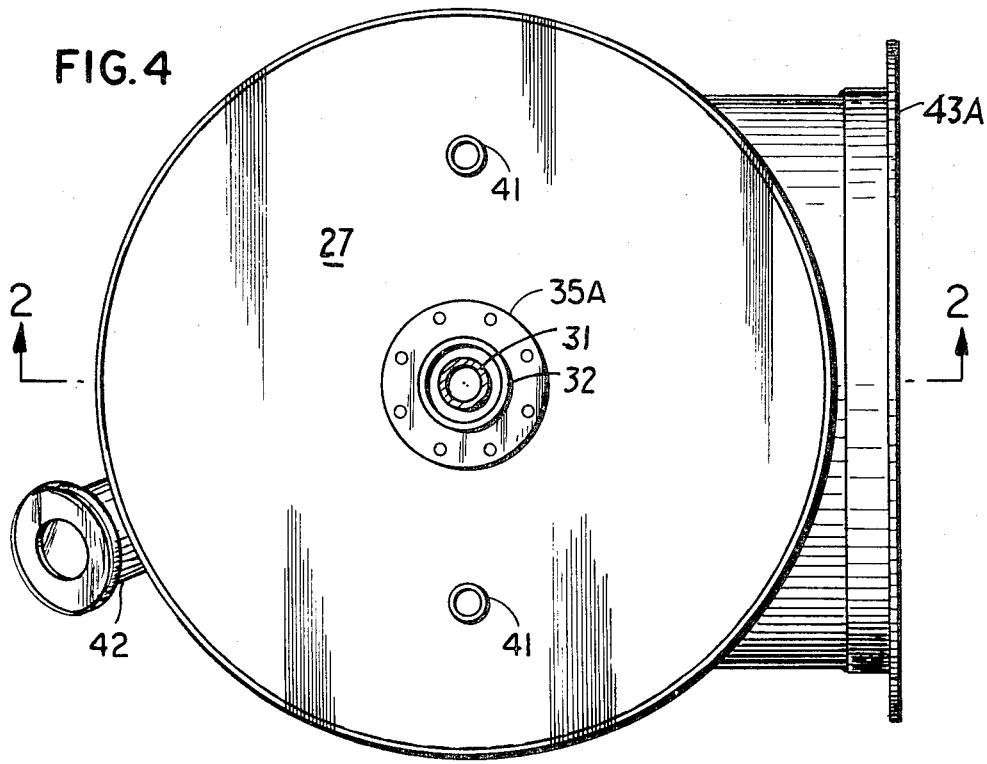
FIG. 4 is a plan view of the after-burner taken along line 4—4 of FIG. 2.
Figure 5:
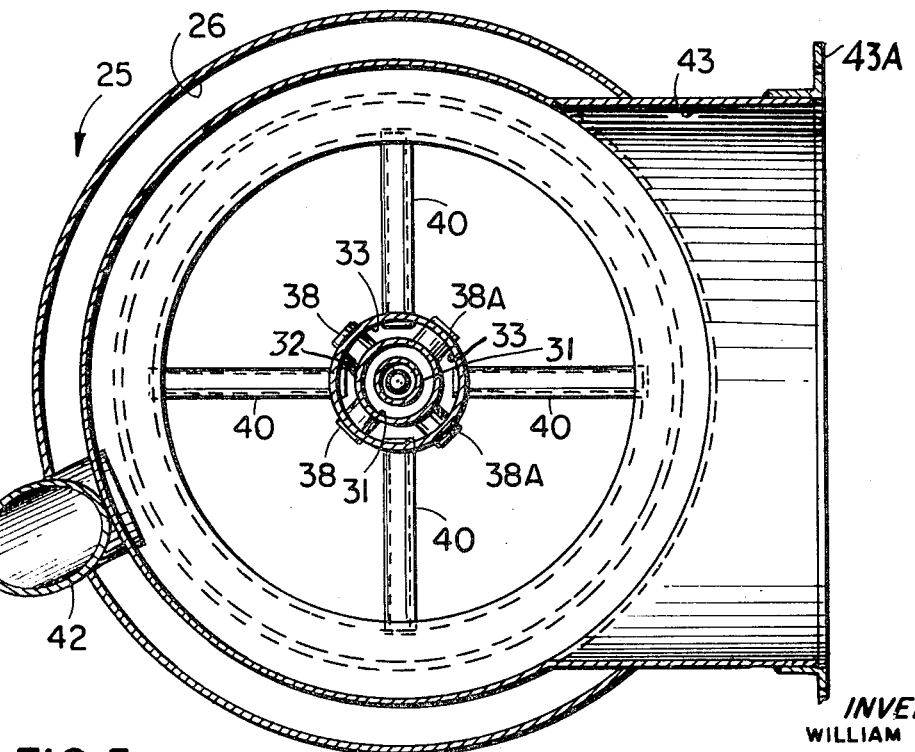
FIG. 5 is a section view of the after-burner assembly as viewed along line 5—5 of FIG. 2.

FIG. 3 is an end view in elevation of the assembly of FIG. 2, while FIG. 4 is a top view, and FIG. 5 a top view as viewed in section along line 5—5. Note that FIG. 5 shows the four spiders 40 communicating with both the housing water jacket shell 26 and the pipe water jacket 33. The numerals in FIGS. 3, 4 and 5 correspond with those of FIG. 2.

Summarizing, in its more particular aspects, the invention provides a novel after-burner assembly for use in a system for recovering copper as blister copper from insulated copper wire scrap in which the insulation comprises plastic, rubber, and the like material, which thermally decomposes to form noxious organic vapors and acid producing radicals. The after-burner assembly is comprised of a housing having a water jacket shell integral with the surface thereof, one end of the housing being closed and the other end having a burner section. The housing is provided with a waste gas inlet entering the side thereof between the closed end and the burner section end and which communicates with the burner section. A concentrically arranged pipe assembly passes through the closed end along the longitudinal axis of the housing and terminates into the burner section, the pipe assembly comprising a fuel atomizing assembly within an air pipe which, in turn, is surrounded by a water jacket. The pipe assembly is connected at the burner end to the housing by radially extending struts (spider) in the form of pipes which also serve as fluid couplers between the water jacket of the pipe assembly and the water jacket shell of the housing so that cooling water fed to the pipe assembly (FIG. 2) circulates around the pipes, through the radially extending struts, into the water jacket shell of the housing and out through pipes 41 shown in FIG. 3. Thus, fuel (e.g. oil) fed to the nozzle mixes with the air fed through the air pipe to provide a high temperature flame in the burner section for effecting substantially complete combustion of the noxious organic vapors. Since all of the structural parts of the burner assembly with which the hot organic vapors come in contact are water cooled, high temperature corrosion by the hot vapors is greatly inhibited, keeping in mind that the hot vapors entering the housing of the burner assembly may range in temperature as high as 1200° F. or 1300° F. A burner assembly of the type illustrated in FIGS. 2 and 3 has operated for prolonged periods of time with only nominal maintenance.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:
1. A system for thermally recovering copper from insulated copper wire scrap in a cupola by destructively volatilizing organic insulation, the volatilized organic insulation forming a hot corrosive waste gas which tends to pollute the atmosphere and corrode an after-burner assembly employed to combust said waste gas, the said system comprising,
   (1) a waste gas conducting means associated with said cupola for conducting away volatile organic gases formed by the destructive distillation of said insulation,
   (2) a steel after-burner assembly coupled to said cupola by means of said waste gas conducting means, said after-burner assembly comprising,
      (a) a water-jacketed housing having ends and sides, one of said ends being closed and the other end terminating in a burner section,
      (b) a concentric pipe assembly passing longitudinally through said housing from said closed end to said burner section,
         said pipe assembly being comprised of a fuel pipe within an air pipe, the air pipe in turn being within a water pipe jacket,
      (c) burner means coupled to said fuel pipe at said burner section of said housing,
      (d) waste gas inlet means located in a side of said housing between the closed end and said burner section of said housing, at which inlet said waste gas conducting means is coupled to said housing,
   (3) a scrubbing tower and at least one packed tower coupled to said after-burner assembly for scrubbing effluent gas exiting from said burner assembly,
   (4) and means coupling said scrubbing tower and at least one packed tower to an electrostatic precipitator for removing solid pollutants therefrom before venting relatively clear gas to the atmosphere.

References Cited

UNITED STATES PATENTS

| | | | |
|---|---|---|---|
| 3,372,528 | 3/1968 | Hoff | 75—25 |
| 3,404,875 | 10/1968 | Hall | 266—37 |
| 3,523,407 | 4/1970 | Humbert | 266—15 |
| 3,365,340 | 1/1968 | Tisdale | 75—60 |
| 3,403,018 | 9/1968 | Thom | 75—25 |
| 3,346,417 | 10/1967 | Ehrlich | 75—65 |
| 3,448,509 | 6/1969 | O'Reilly | 134—2 |
| 2,815,278 | 12/1957 | Wilkins | 75—65 R |

FOREIGN PATENTS

| | | | |
|---|---|---|---|
| 565,761 | 11/1958 | Canada | 75—63 |
| 814,865 | 6/1959 | Great Britain | 75—63 |

L. DEWAYNE RUTLEDGE, Primary Examiner

P. D. ROSENBERG, Assistant Examiner

U.S. Cl. X.R.

75—25, 72; 266—15; 431—5